US008646686B2

(12) United States Patent
Bullwinkel

(10) Patent No.: US 8,646,686 B2

(45) Date of Patent: Feb. 11, 2014

(54) SECURE SYSTEM FOR CREATING AND VALIDATING PERSONAL IDENTIFICATION CARDS WITH OPERATOR DISCRETION

(76) Inventor: Benton William Bullwinkel, Lemont, IL (US)

( * ) Notice: Subject to any disclaimer, the term of this patent is extended or adjusted under 35 U.S.C. 154(b) by 292 days.

(21) Appl. No.: 13/136,816

(22) Filed: Aug. 11, 2011

(65) Prior Publication Data

US 2013/0037607 A1 Feb. 14, 2013

(51) Int. Cl.
*G06K 5/00* (2006.01)

(52) U.S. Cl.
USPC .............................. 235/380; 235/472; 235/487

(58) Field of Classification Search
USPC .......................................... 235/380, 472, 487
See application file for complete search history.

(56) References Cited

U.S. PATENT DOCUMENTS

| | | | |
|---|---|---|---|
| 6,354,494 B1 | 3/2002 | Marcus | |
| 6,394,356 B1 | 5/2002 | Zagami | |
| 6,536,665 B1 | 3/2003 | Ray et al. | |
| 7,475,812 B1 | 1/2009 | Novozhenets et al. | |
| 7,484,659 B2 | 2/2009 | Johanns et al. | |
| 7,669,758 B2 | 3/2010 | Erikson | |
| 7,735,728 B2 | 6/2010 | Wallerstorfer | |
| 7,762,456 B2 | 7/2010 | Register et al. | |
| 7,850,077 B2 | 12/2010 | Talwerdi et al. | |
| 7,933,842 B2 | 4/2011 | Hobson et al. | |
| 8,442,221 B2 * | 5/2013 | Ming | 380/54 |
| 2009/0157557 A1 | 6/2009 | Hobson et al. | |
| 2012/0106805 A1 * | 5/2012 | Shuster | 382/115 |

* cited by examiner

*Primary Examiner* — Allyson Trail

(57) ABSTRACT

An identification card (ID card) creation and validation system where the ID card includes at least one unambiguous digital identifier together with additional information stored in predetermined data fields. Upon creation, the ID card is scanned to create and store a composite digital image in a central database on a secured server. On presentation by a user to a human operator-gatekeeper, the ID card is scanned and encoded and the encoded data sent to a central database where it is compared with the stored image information of that ID card to positively identify the user using the unambiguous digital information. If the user is positively identified, the encoded data is compared with the stored data to generate to identify and transmit any anomalies to the gatekeeper, thereby allowing the gatekeeper to exercise independent judgment in allowing or denying admission privileges to the presenter.

4 Claims, 1 Drawing Sheet

SECURE SYSTEM FOR CREATING AND VALIDATING PERSONAL IDENTIFICATION CARDS WITH OPERATOR DISCRETION

FIELD OF THE INVENTION

This invention relates to a system for issuing identification cards (ID cards) such as driver's licenses and credit cards which with which identification can be positively made using a distributed network, such as the internet. More particularly. the invention relates to a system for improving the security of online transactions while reducing erroneous rejections by permitting the exercise of informed judgment by a human operator at the point of card presentation.

BACKGROUND OF THE INVENTION

Numerous prior art patents and patent applications attempt to deal with the problem of producing and authenticating individual ID cards which are difficult or impossible to alter or duplicate, and which create an electronic trail of individual transactions. However, this inventor has been unable to find (with one exception, noted below) any prior art system in which the point-of-presentation operator (gatekeeper) is given the necessary information and discretion to override what would otherwise be a strict go/no-go or pass-fail decision made by a central computer, with no opportunity for the exercise of operator judgment. For example:

Marcus et al., U.S. Pat. No. 6,354,494 (Mar. 12, 2002) discloses a method for producing and authenticating an ID card. The card is scanned to produce a digital signal which is compressed, encrypted and encoded in a 2-D barcode, and also printed into another portion of the card. For validation, the card is scanned, decoded, decrypted, expanded and displayed. The data can be sent to a central computer, but the center is not necessary to the process. The comparison process does not produce a nuanced response for the gatekeeper's evaluation and judgment.

Zagami, U.S. Pat. No. 6,394,356 (May 28, 2002) discloses an access control system for monitoring cardholder ingress and egress. An access gate camera captures and sends a unique identifier (an image of a person and/or a document) to a central database together with time and place information. There is no provision for feedback of detected discrepancies to enable an operator to exercise informed judgment as to whether the card is valid or not in a questionable situation.

Ray et al., U.S. Pat. No. 6,536,665 (Mar. 25, 2003) discloses a personal identification badge having areas of both graphic images and machine-readable data. The card is produced by first forming a digital image, then generating a random number from a seed value, then adding the random numbers to produce a modified digital image, and finally printing that image on the card. The badge is authenticated by scanning the card and correlating it with the stored digital image. There is no central database of stored identification data, and the correlation process cannot produce a nuanced response for the gatekeeper's evaluation and informed judgment as to the validity of the card.

Novozhenets, et al., U.S. Pat. No. 7,475,812 (Jan. 13, 2009) discloses a method of access control using "smart" card badges and readers. Each gatekeeper has access to a database containing identifiers, access privileges and card serial numbers. The gatekeeper's reader generates a credential identifier code and "site secret key". The inventor's complicated multistep process generates only an approved-disapproved or pass-fail result. Badge numbers identify individual holders, and an issue code identifies each reissue of the badge if lost or damaged to prevent re-use of an old badge. The inventor's purpose is to foil copying and forging of badges. The system provides no feedback to the gatekeeper to aid in judging an ambiguous situation.

Johanns, et al., U.S. Pat. No. 7,484,659 (Feb. 3, 2009) discloses a system for detecting unauthorized use of credit/debit cards. Personal information (photo, fingerprint, etc.) is encrypted and encoded on the holder's ID card itself. The gatekeeper reads the card, with or without the holder's fingerprint, whereupon a central computer compares the data with stored data and either approves or disapproves the transaction. The gatekeeper gets no other feedback, and can only compare the photo on the ID card with the presenter's actual appearance at the time of presentation.

Erikson, U.S. Pat. No. 7,669,758 (Mar. 2, 2010) discloses a system in which an input device records a presenter's ID card (such as a drivers' license) to generate "account application" for a new credit card or the like. There is no feedback of card discrepancies which would allow for exercise of the gatekeeper's judgment.

Register Jr., et al., U.S. Pat. No. 7,762,456 (Jul. 27, 2010) discloses a biometric-based ID system that stores encrypted biometric information on the ID card itself, rather than in a central database. On presentation, a reader interrogates the presenter, and then compares the new information with the stored information in the card, and makes a pass-fail decision. The operator is given no opportunity to apply informed judgment.

Talweridi, et al., U.S. Pat. No. 7,850,077 (Dec. 14, 2010) discloses a document authentication apparatus and system in which a scanner "illuminates" certain security features in a document "substrate" (such as a check, credit/debit card, stock certificate or passport) which a sensor then detects, digitizes and records for later matching when item is presented to a gatekeeper for authentication. The system generates a pass-fail "match/no match" report without indicating where an anomaly was detected, and does not feed the source of the error back to the gatekeeper to allow the exercise of judgment.

Hobson, et al. U.S. Pat. No. 7,933,842 (Apr. 26, 2011) and US 2009/0157557 (pub. Jun. 18, 2009) discloses a system for authenticating transactions other than "card present" transactions in which the merchant (gatekeeper) physically sees and handles the presenter's ID card. The system provides no feedback of discrepancies enabling the exercise of judgment by the gatekeeper.

Wallerstorfer, U.S. Pat. No. 7,735,728 (Jun. 15, 2010) is an access control device for checking high-value limited-time identification cards such as ski lift passes and the like. It is an exception to all of the above in that a previously stored image data from a central computer is fed back to the gatekeeper to allow the exercise of the gatekeeper's judgment. A camera at the gatekeeper' station records a real-time image of each presenter rather than reading an image from the presenter's card. The station sends the image to a remote central monitoring station where another operator compares it to a previously recorded image of that user, taken when the pass was initially purchased. Although the stored image can be fed back to the gatekeeper to allow exercise of judgment, the system has no provision for detecting other anomalies or providing nuanced feedback.

SUMMARY OF THE INVENTION

For each user to be made identifiable by the system, an identification card (ID card) is initially produced by conventional methods. The ID card has visually separate regions which include at least one unambiguous digital identifier such an optically readable barcode. The card may also include other visual information such as a photograph of the user, a written signature, and various other fields of text information located in predetermined locations. Other visual data such as a design, pattern or holograph may also be included. During or after creation, the ID card is scanned to create a composite digital image which is transmitted through a data network to a secured server where it is stored in a central database.

In use, the user presents his or her ID card to a human operator at an gatekeeper station where it is optically scanned and digitally encoded. The encoded image is transmitted from the gatekeeper station through data network to the secured server to the central database for a two-step comparison with the previously stored image information. In the first step, the ID card is either positively identified or positively rejected, based on unambiguous digital information such as a barcode identifier which is unique to the individual. In the second step, the central comparison computer compares other digitally encoded visual data on the card (such as a photograph, facsimile signature or the like) to the stored data, field by field, from which it generates an error message. The error message is then transmitted back to the gatekeeper. If the user is has not been positively identified in step one, the error message is "fail". If the user has been positively identified, the error message specifically identifies the data field in which an anomaly has been detected and the relative degree of non-conformity to the stored data about that field, thereby allowing the operator to exercise independent judgment as to whether the error is sufficiently significant to deny ID privileges to the presenter. In this way a serious anomaly (such as an altered photograph or date of birth) can be distinguished from a minor anomaly (such as a stain, crease, or scratch mark). This significantly decreases the probability of false positives in cases where the ID card is valid, but merely defaced in a minor way.

DESCRIPTION OF THE PREFERRED EMBODIMENT

Figure 1:
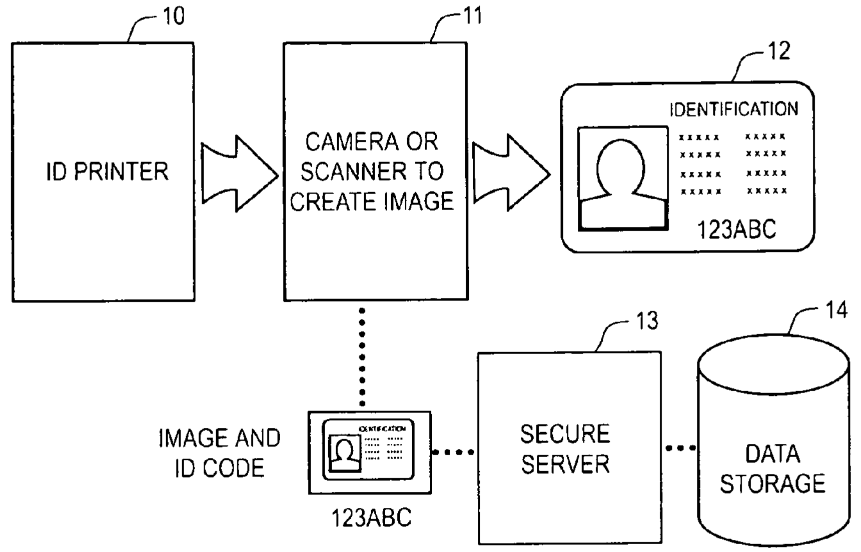
FIG. 1 is a schematic drawing showing the creation of a secure ID card according to the invention, followed by the transmission of that card's information, including an unambiguous identifier such as a digital barcode, to a secure server connected with a central data storage means.

Referring to FIG. 1, the process of utilizing the invention begins with the production of a secure ID card. The prospective user presents a current photograph (which can be taken at the time the ID card is made). Other graphic information can also be recorded, such as a signature, fingerprint or retinal scan. This graphical information, along with other unambiguous textual information such as license number, employee number, date of birth, gender, address, degree of clearance (if any) and the like is also recorded on the ID card in human-readable characters.

This information, consisting of both graphics and text, is then combined and fixed in ID card form by a printer 10, which by means of a digital camera or scanner 11 scans the image and creates a digital image of the finished card 12. A digital image of the ID card including both graphic and textual information is then sent through a suitable network or distribution system (such as the internet), preferably in encrypted form, to a secure central server 13 where it is stored in a suitable data storage means 14 in the known conventional way.

Figure 2:
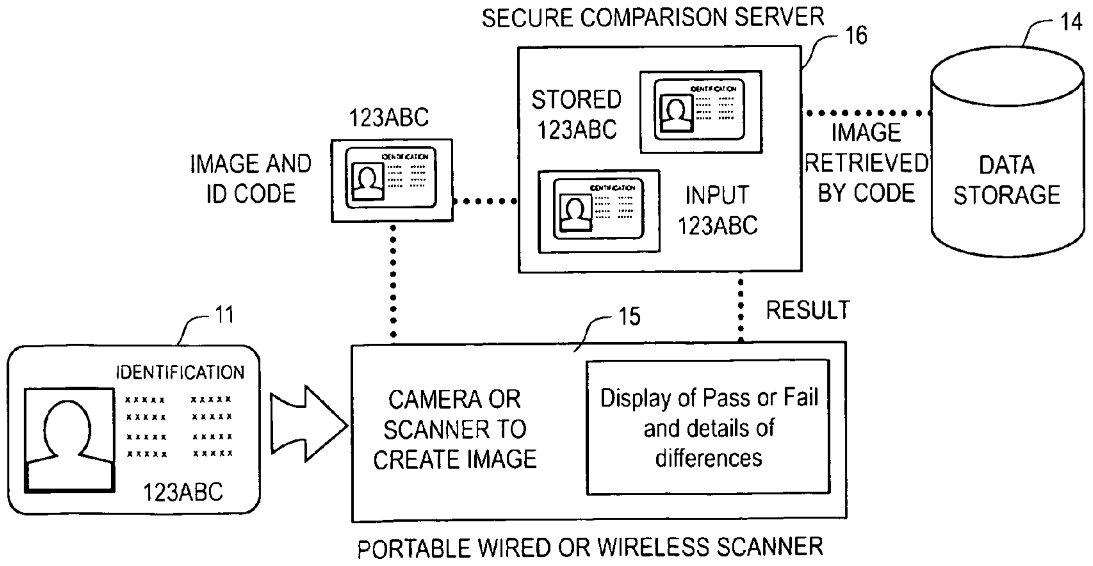
FIG. 2 is a schematic drawing showing the presentation of an ID card at a operator-gatekeeper's checkpoint, the transmission of the card's information back to a secure server, the comparison of that data with an unambiguous identifier retrieved from the central data storage means, the creation of both a pass-fail error message and an ancillary error message pointing out the area or areas of failure, and the transmission of that pass-fail error and ancillary message back to the operator-gatekeeper for the exercise of informed judgment as to the whether the ID card is acceptable or not.

In use, and as shown in FIG. 2, the user presents his or her ID card 11 to the operator/gatekeeper who employs an optical reading device 15 to make a digital image of the card. This digital image is transmitted over a suitable suitable network or distribution system, again preferably in encrypted form, to a secure central comparison server 16. On receipt of this digital information the server 16 performs a first comparison step using one or more of the unambiguous data fields in the digitized image (such as a digital barcode) that the ID card is associated with a known cardholder in the database in the storage means 14. If the first comparison step results in a positive identification that the presenter is recognized as a person whose ID card information is stored in the database, the comparison server 16 then performs a second comparison step using digitized optical data from one or more of the other data fields in the presenter's card, comparing it with the individual corresponding fields in the stored database for that individual. If the comparison server recognizes the individual fields of the presented ID card to be within a predetermined degree of agreement with the stored data, meaning that the number of non-matching pixels (errors) in the stored data fields is less than a predetermined error limit, the comparison server 16 transmits a result signal back to the operator indicating "pass".

Thus far it has been assumed that in the case of the present example the result message is either a clear "pass" (indicating a positive match from unambiguous ID information, and errors within predetermined acceptable limits on all other data fields), or a clear "fail" (indicating either no match from unambiguous ID information, or individual or cumulative errors in excess of predetermined acceptable limits in other data fields).

If, however, the comparison server determines that the number of errors (non-matching pixels) in one or more data fields exceeds the predetermined error limit for that field, it sends a nuanced result signal back to the operator which includes specific information as to each of the data fields which was found to contain errors exceeding the predetermined limit, and preferably by how much. It will be recognized that certain data fields may be assigned an error limit with is less forgiving of error, such as the date of birth on a drivers' license presented as proof of age for the purchases of liquor. Others, such as a handwritten signature, where the risk of fraud is presumably less, may be assigned a more tolerant standard.

In practice, and by way of example, a user's ID card may have become faded, scratched, or damaged in some other way (such as creasing and folding), but still capable of being read by the gatekeeper's reader and providing unambiguous identity information with which the comparison server can perform the second comparison step. In this second step, and according to the invention, the comparison server sends back a message to the gatekeeper indicating which data fields are suspect, and to what degree. Thus the gatekeeper is provided with sufficient information with which to make a reasoned judgment an decision as to whether to accept the ID card, reject it, or (in the case of a falsified photo or date of birth) seize it for law enforcement or other valid and legal purposes.

It is therefore a feature of the invention that each data field other than the designated unambiguous fields has an selectable range of error between clearly acceptable ("pass") and clearly unacceptable ("fail"), within which the comparison server 16 is programmed to return to the gatekeeper a nuanced result message which specifies which data fields contain anomalies, and preferably to what degree. This enables the gatekeeper to make an informed judgment in real time as to whether the ID card credential is valid or merely questionable, and if questionable, what questions to ask to obtain more positive identification.

The invention claimed is:

1. A method of making and using a secure ID card in which ambiguous discrepancies are identified and presented to a human operator to allow a pass-fail decision to be made on the basis of informed human judgment, the method comprising the steps of:

creating an ID card for a user which includes at least one unambiguous digital identifier, at least one graphical information field, and at least one text information data field in which each of said graphical information fields and text information data fields is assigned a predetermined limit of acceptable anomaly;

scanning said ID card to create a composite digital image;

transmitting said composite digital image over a data network to a data server;

storing said composite digital image on a central database in association with said at least one unambiguous digital identifier;

optically scanning and digitally encoding a presenter's ID card presented for authentication at a gatekeeper station attended by a human operator;

transmitting said digitally encoded presenter's ID card to a comparison computer associated with said central database;

comparing said digitally encoded presenter's ID card with the digital images stored in said central database;

performing a first matching step using said comparison computer to match said presenter's ID card with an unambiguous digital identifier in said central database, and generating a first pass-fail result;

if said first matching step generates a pass result, performing a second matching step using said comparison computer to compare said presenter's ID card with the composite digital image stored on said central database in association with said presenter's ID card in which said comparison computer compares the said at least one text information data field and at least one graphical information field of said presenter's ID card with the corresponding data stored in said central computer against its said predetermined limit of acceptable anomaly, generating a numerical error message, and including said numerical error message in said first and second pass-fail results with an indication of which information field failed to yield a match with the presenter's ID card; and transmitting said first and second pass-fail results, together with said indication of which information field failed to yield a match with the presenter's ID card, back to said gatekeeper station and human operator for the exercise of operator judgment in accepting said presenter's ID card, whereby said human operator is enabled to determine which field of the presenter's ID card has caused an anomaly, and to what degree.

2. The method of claim 1 in which said unambiguous digital identifier is a numerical barcode unique to the user.

3. The method of claim 1 in which said at least one graphical information field is chosen from the group including the user's photograph and the user's signature.

4. The method of claim 1 in which said at least one text information data field is chosen from the group including the user's date of birth, the user's address, the user's social security number, the user's driver's license number, the user's state-issued identification number, and the user's passport number.

* * * * *